United States Patent
Bai et al.

(10) Patent No.: US 8,472,499 B2
(45) Date of Patent: Jun. 25, 2013

(54) ADAPTIVE MULTI-CHANNEL INTEGRATED WIRELESS NETWORK SYSTEM ARCHITECTURE

(75) Inventors: Haowei Bai, Glendale, AZ (US); Randall H. Black, Glendale, AZ (US); Blaine B. Shelton, Peoria, AZ (US); Allalaghatta Pavan, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1578 days.

(21) Appl. No.: 11/958,835

(22) Filed: Dec. 18, 2007

(65) Prior Publication Data

US 2009/0154528 A1 Jun. 18, 2009

(51) Int. Cl.
*H04B 1/00* (2006.01)
(52) U.S. Cl.
USPC ........... 375/134; 375/132; 375/133; 375/135; 375/E1.033; 375/E1.036; 375/E1.037; 375/E1.035; 375/E1.034; 370/465; 370/335; 370/342; 370/441; 370/515; 370/356; 370/392
(58) Field of Classification Search
USPC .............. 375/132, 133, 134, 135, E1.033, 375/E1.036, E1.037, E1.034, E1.035; 370/465, 370/335, 342, 441, 515, 356, 392
See application file for complete search history.

(56) References Cited

U.S. PATENT DOCUMENTS

| | | | |
|---|---|---|---|
| 5,491,531 A * | 2/1996 | Adams et al. ................. | 375/354 |
| 6,338,046 B1 * | 1/2002 | Saari et al. ..................... | 705/34 |
| 6,888,876 B1 * | 5/2005 | Mason et al. ................. | 375/132 |
| 7,315,565 B2 * | 1/2008 | Kim .............................. | 375/132 |
| 2002/0186749 A1 * | 12/2002 | Jones ............................ | 375/132 |
| 2003/0198246 A1 * | 10/2003 | Lifshitz et al. ................ | 370/445 |
| 2003/0228846 A1 * | 12/2003 | Berliner et al. ............. | 455/67.11 |
| 2005/0117526 A1 * | 6/2005 | Melnik ......................... | 370/254 |
| 2006/0251119 A1 * | 11/2006 | Ramesh ........................ | 370/468 |
| 2009/0274193 A1 * | 11/2009 | Kizu et al. .................... | 375/133 |

* cited by examiner

*Primary Examiner* — Daniel Washburn
*Assistant Examiner* — Rahel Guarino
(74) *Attorney, Agent, or Firm* — Ingrassia Fisher & Lorenz, P.C.

(57) ABSTRACT

An adaptive multi-channel architecture for a wireless network is provided. A frequency hopping sequence generator module is compliant with a frequency hopping spread spectrum (FHSS) communications protocol. The frequency hopping sequence generator module is capable of performing FHSS concurrently on a plurality of communications channels. A frequency replacement module is coupled to the frequency hopping sequence generator module. The frequency replacement module is configured to receive feedback data over a feedback channel and adaptively select a transmission channel from the plurality of communications channels using the feedback data.

23 Claims, 3 Drawing Sheets

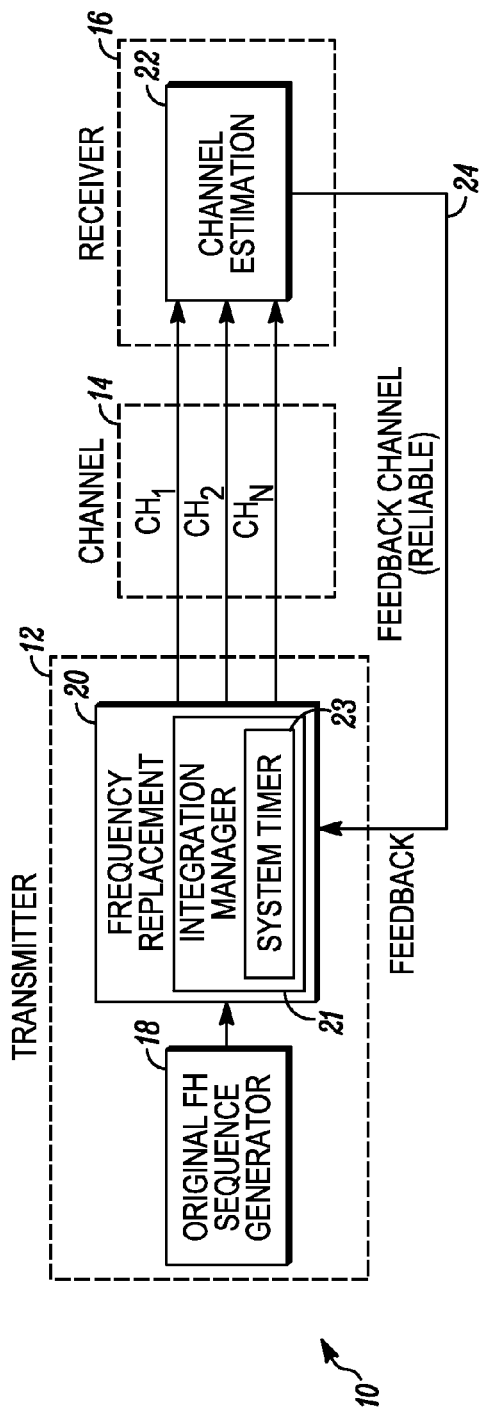
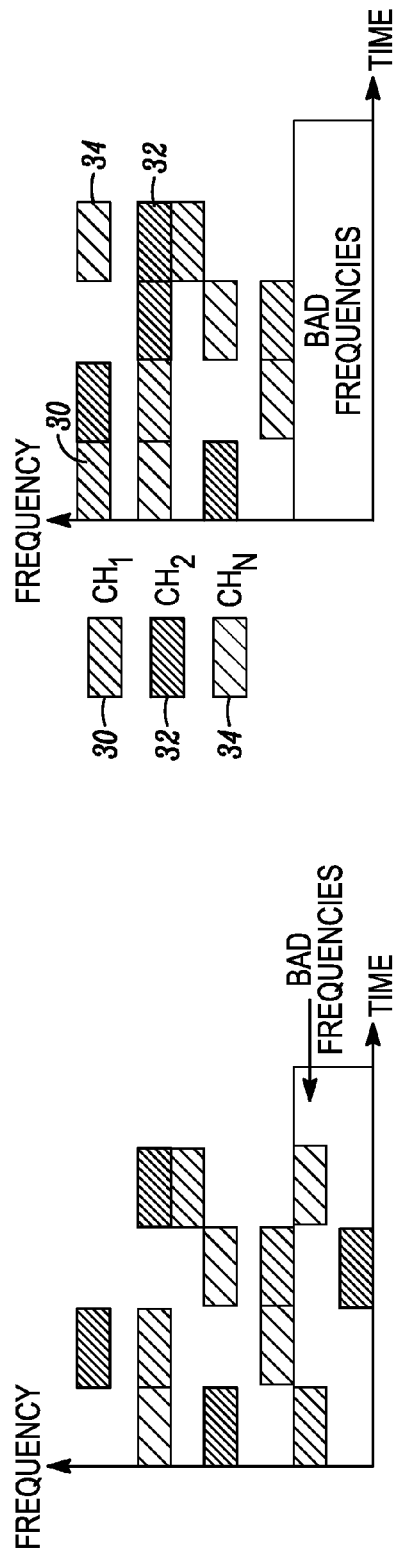
FIG. 1
FIG. 2
FIG. 3

| APPLICATION REQUIREMENTS | MAC/ PHY ADAPTATION | ROUTING PROTOCOL ADAPTATION |
|---|---|---|
| HIGH CRITICALITY, HIGH QoS | MULTI-BAND TRANSMISSION AND CHECKING PAIRS | LOW CONGESTION-LEVEL PATH |
| LOW CRITICALITY, HIGH QoS | ADAPTIVE MULTI-BAND FHSS | LOW CONGESTION-LEVEL PATH |
| HIGH CRITICALITY, LOW QoS | (NOT LIKELY) | (NOT LIKELY) |
| LOW CRITICALITY, LOW QoS | FHSS ON SINGLE BAND | LEGACY ROUTING ALGORITHMS |

FIG. 6

ADAPTIVE MULTI-CHANNEL INTEGRATED WIRELESS NETWORK SYSTEM ARCHITECTURE

FIELD OF THE INVENTION

The present invention generally relates to wireless networks, and more particularly, to end node and system architecture for integrating multiple criticalities and quality of service (QoS) to support integration of multiple control applications in an wireless network.

BACKGROUND OF THE INVENTION

NASA initiatives for space exploration include the development of programs such as the Lunar Precursor Robotics Program and Project Constellation programs. Aspects of these programs include lunar or extra-planetary base concepts and operations, including precursor missions to the Moon and Mars. To achieve these initiatives, significant support from communications systems, such as data networks, may be needed.

Among the NASA initiatives is a desire to integrate communication between all space assets (including spacecraft, robotics, equipment and space or land-based personnel) over a single wireless network. Conventionally, communication between space assets has occurred over a number of interconnected networks. The operation and management of these interconnected networks can incur significant complexity and cost. However, the integration of assets over a single wireless network may also be fraught with challenges. For example, because wireless signals travel at least partially through a space environment, these signals may be subject to signal (and packet) losses. In addition, space travel may place inherent criticalities and quality of service requirements on a communications network. Finally, many space assets are in motion at any one time, constantly changing the applicable communications environment.

Accordingly, it is desirable to provide an end node and system architecture making it possible to integrate a variety of space assets together, while meeting multiple criticalities and quality of service constraints inherent in space travel and addressing a constantly changing communications environment. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

In one embodiment, by way of example only, an adaptive multi-channel architecture for a wireless network is provided. A frequency hopping sequence generator module is compliant with a frequency hopping spread spectrum (FHSS) communications protocol. The frequency hopping sequence generator module is capable of performing FHSS concurrently on a plurality of communications channels. A frequency replacement module is coupled to the frequency hopping sequence generator module. The frequency replacement module is configured to receive feedback data over a feedback channel and adaptively select a transmission channel from the plurality of communications channels using the feedback data.

In another embodiment, again by way of example only, an adaptive multi-channel communications system is provided. The system includes frequency hopping means for generating a frequency hopping sequence compliant with a frequency hopping spread spectrum (FHSS) communications protocol and performing FHSS concurrently on a plurality of communications channels, and frequency selection means coupled to the frequency hopping means, the frequency selection means receiving feedback data over a feedback channel and adaptively selecting a transmission channel from the plurality of communications channels using the feedback data.

In still another embodiment, again by way of example only, a method for adaptive multi-channel communication in a wireless network includes generating a frequency hopping sequence compliant with a frequency hopping spread spectrum (FHSS) communications protocol concurrently over a plurality of communications channels, receiving feedback data over a feedback channel, and adaptively selecting at least one transmission channel from the plurality of communications channels using the feedback data.

In still another embodiment, again by way of example only, an adaptive multi-channel architecture for a wireless network includes an integration manager module, operational in the multi-channel architecture, for integrating scheduled and unscheduled communications traffic into a single transmission channel.

BRIEF DESCRIPTION OF THE DRAWINGS

The present invention will hereinafter be described in conjunction with the following drawing figures, wherein like numerals denote like elements, and FIG. 1 is a block diagram of an exemplary adaptive multi-channel communications architecture;

FIG. 2 illustrates a frequency hopping communications protocol;

FIG. 3 illustrates an adaptive frequency hopping communications protocol in contrast to the frequency hopping communications protocol depicted in FIG. 2;

FIG. 6 is a table of communications protocol adaptation across multiple layers for integrating applications with different criticality and Quality of Service (QoS) requirements.

DETAILED DESCRIPTION OF THE INVENTION

Figure 4:
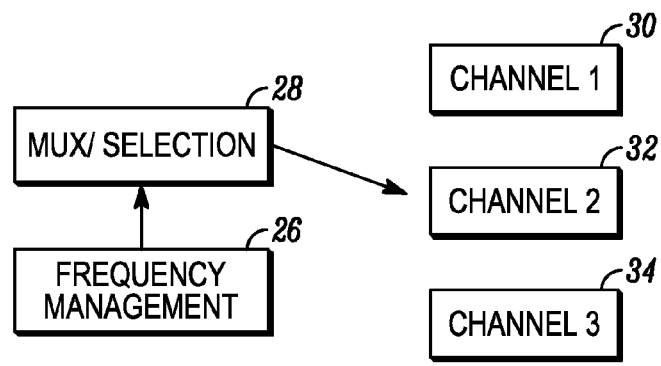
FIG. 4 is a block diagram of functional components of an adaptive frequency hopping communications protocol.

The following detailed description of the invention is merely exemplary in nature and is not intended to limit the invention or the application and uses of the invention. Furthermore, there is no intention to be bound by any theory presented in the preceding background of the invention or the following detailed description of the invention.

The present description and following claimed subject matter present exemplary system and method embodiments for adaptive multi-channel communications over a wireless network. Such exemplary embodiments may be useful in space applications having accompanying criticalities and quality of service requirements. These embodiments incorporate various innovations, including the implementation of a frequency hopping spread spectrum (FHSS) compliant communications protocol concurrently across a number of communications channels or bands. A feedback channel is implemented, allowing a transmitter to receive both frequency status (allowing the transmitter to selectively choose appropriate transmission channels from the number of communications channels) and network status (allowing the transmitter to selectively implement a network routing algorithm tailored to an application of the communicated data). These embodiments integrate both scheduled and nonscheduled traffic into the same bandwidth. In additional embodiments, multiple applications with different criticalities and Quality of Service (QoS) requirements may be integrated into a single wireless network. As will be further described, these embodiments are cross-layer in design, utilizing a combination of hardware, software, and firmware for implementation.

Turning to FIG. 1, a block diagram of exemplary physical layer (PHY) communications hardware components 10 that may form part of an overall adaptive multi-channel communications architecture is depicted. Components 10 include a transmitter module 12, a representation of multiple communications channels or bands 14, and a receiver module 16. Transmitter module 12 is shown including a frequency hopping sequence generator module 18. Such a frequency hopping sequence generator may be compliant with frequency hopping spread spectrum (FHSS) communications protocols known in the art.

In a departure from the prior art, however, transmitter module 12 includes a frequency replacement module 20. Frequency replacement module 20 is adapted for performing FHSS concurrently on a number of communications channels as seen in channels 14. To accomplish such an implementation, multiple PHY layers may be implemented having multiple frequency bands. Again, FHSS is performed on each of these bands and coordinated across all bands. Using FHSS over multiple bands serves to improve reliability of the communications transmission.

Frequency replacement module may include an integration manager 21 module operational on the frequency replacement module for integrating scheduled and unscheduled communications traffic into the same communication channel 14 as will be further described. The integration manager module may include a system timer 23 for dividing bandwidth of the transmission channel into a scheduled portion, and unscheduled portion, and a network status portion.

Receiver 16 includes a channel estimation module 22 configured to provide feedback over a dedicated feedback channel 24 to frequency replacement module 20. Here again, feedback channel 24 may be implemented as an additional PHY layer on a different frequency band. Feedback 24 may be adapted to carry both frequency status data and network status data as will be further described. Frequency status data may indicate the relative health of a particular communications channel. Such frequency status data may be maintained by the frequency replacement module and/or transmitter 12 in a table. The health of the communications channels 14 using nomenclature such as "good" and "bad" communications channels may be noted in this manner.

In addition to frequency status, other feedback data such as metrics reflecting the overall communication environment, link quality, traffic load and congestion level may be sent over feedback channel 24 and received by the transmitter module 12. Frequency replacement module 20 utilizes this feedback data to adaptively select one or more healthy (e.g., "good") communications channels as transmission channels. Data may be transmitted redundantly and concurrently over more than one channel. As will be further described, depending upon an application or type of the communicated data, the transmitter module 12 may adaptively select an appropriate protocol, which may include the redundant transmission of data over multiple channels. Feedback channel 24 provides information to a routing protocol to assist in calculating an appropriate route for the communicated data.

In addition to adaptively selecting one or more transmission channels, such feedback data may be shared among all nodes in the communication architecture, and may be utilized by software at various layers to optimize the quality of service and level of criticality performance. For example, high criticality and high quality of service application requirements of a certain communication may be transmitted and routed on multiple bands as previously described and through low congestion level links as will be further described.

While FIG. 1 depicts PHY layer components as functional blocks, it should be also understood that various software and firmware components may be incorporated into such components as frequency replacement module 20. As will be further described, the components 10 are cross-layered. For example, various MAC, transport, link and application layer components may be implemented to be operational on or associated with the components 10.

FIG. 2 illustrates a frequency hopping spread spectrum (FHSS) communications protocol using multiple channels (represented as channels 30, 32, and 34). As seen, the protocol changes or "hops" between randomly selected frequencies. Because bad frequencies are unknown (due to the absence of a feedback channel), over time each of the communications channels 30, 32, and 34 hops into a bad frequency for at least a portion of time. This is shown first in time by channel 30, next by channel 32 and finally by channel 34. As a result, each of the channels experiences periods of unreliability and data loss.

In contrast to FIG. 2, FIG. 3 illustrates an adaptive multi-channel FHSS implementation. Again, communications channels 30, 32, and 34 are shown. Due to the inclusion of the feedback channel, bad frequencies across all bands are known and marked by the transmitter, and are shared among all nodes in the architecture. As a result, the communications channels hop across various good frequencies over time. Hence, the overall reliability of the communications network is appreciably increased, and data loss is reduced.

FIG. 4 illustrates exemplary functional components of an adaptive multi-channel FHSS protocol. Such functionality may be incorporated as physical layer hardware or through a combination of hardware, software, and firmware over multiple layers. Frequency management functionality 26 describes the adaptive functionality associated with the frequency replacement module 20 (FIG. 1). Such adaptive functionality maintains a table of bad frequencies and other feedback data, and adaptively selects an appropriate transmission channel(s) from an available number of communications channels. Such selection functionality may be provided by selection functionality 28, using such hardware as multiplexers (MUXs) or similar hardware or combinations of hardware. Selection functionality 28 adaptively selects one or more transmission channels 30, 32, and/or 34.

In one embodiment, the nature of the communication (such as data having a high criticality requirement) may justify the selection of multiple bands/transmission channels having redundant communication. In this case, the selection functionality 28 and/or frequency management functionality 26 may implement a transmission algorithm such as a voting/check pairs algorithm when all bands are healthy.

Figure 5:
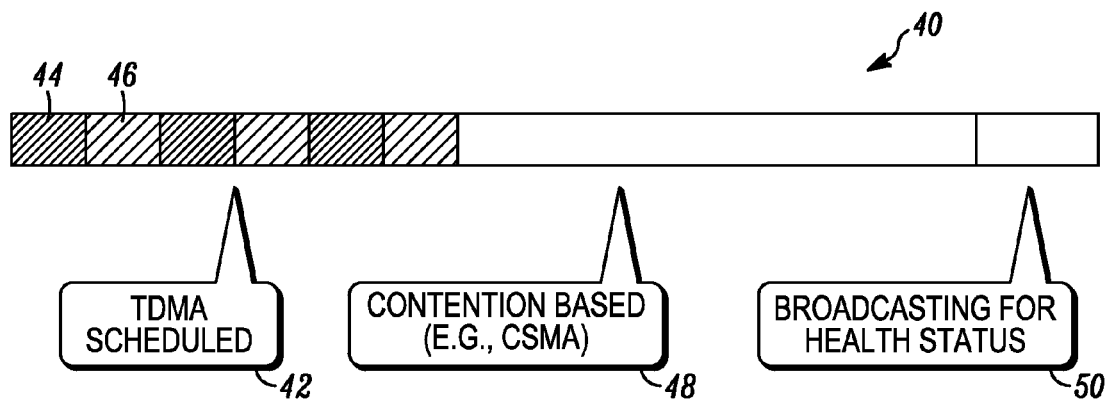
FIG. 5 is an exemplary bandwidth of a communications signal divided into scheduled, unscheduled, and network status portions.

Referring now to FIG. 5, an additional aspect of an exemplary adaptive multi-channel communications protocol for improving quality and reliability is shown, namely an exemplary allocated bandwidth 40 of data communications. Transmitter 12 (FIG. 1), using a combination of software and/or firmware (at the MAC and transport layers), may allocate and dedicate the bandwidth 40 which integrates synchronous and asynchronous data transmissions (periodic and aperiodic traffic). A bandwidth 40 may be allocated and dedicated by the transmitter 12. A first portion is allocated for scheduled 42 data communication (shown by slots 44 and 46). The first portion may utilize a deterministic scheduling communications protocol, such as time division multiple access (TDMA) communications protocol. A second portion of the bandwidth 40 is reserved for unscheduled traffic 48. The second portion may utilize an unscheduled or asynchronous media access control communications protocol, such as carrier sense multiple access (CSMA) communications protocol. Finally, a portion of the bandwidth 40 is reserved for health status data 50, such as the aforementioned frequency status or network status data. Again, the health status data 50 portion of the bandwidth may be shared across various nodes of the network to improve overall quality and reliability.

The integration of periodic and aperiodic traffic as shown may be implemented at the link (MAC) layer for radio frequency (RF) media access control. Such an implementation provides compatibility between different types of wireless nodes. In one embodiment, the integration may be implemented inside a link layer application specific integrated circuit (ASIC). The media accesses or transmissions may be split into cycles (bandwidth). Referring again to FIG. 5, the transmission begins with periodic (or scheduled) traffic, which may include a TDMA compliant protocol. Once the pre-allocated time for the TDMA transmission concludes, aperiodic (unscheduled) packets may be transmitted. Each sequence may be controlled by global time, which may be synchronized by sending a time stamp at the beginning of each cycle.

Hardware components 10 such as integration manager module 21 (FIG. 1) may execute algorithms to facilitate the integration of a new node into the wireless architecture. In a first exemplary algorithm described in terms of a master and slave configuration, the new slave node may keep sending Request (REQ) packets during asynchronous time. Each packet transmission may use a new frequency of the frequency sequence until the slave node reaches the same frequency as the master. In such a scenario, success may be indicated by receipt of an Acknowledgement (ACK) packet from the master.

In a second exemplary algorithm, the synchronization time of a new node into the wireless architecture may be reduced by using a history table based predictor. Such a predictor may be implemented in hardware utilizing one (1) or two (2) bit lengths. In addition, any prediction algorithm may be implemented to predict the next frequency that the slave node should use to send a successive REQ packet.

The scheduled portion 42 of the bandwidth 40 may be reserved for application-specific communications having higher criticalities and demanding a higher quality of service. Such application specific communications may be command and control data for a spacecraft. Application-specific communication having a lower priority may be sent using the unscheduled portion 48 of the bandwidth 40, such as http data or email packets. In this way, the bandwidth 40 of an adaptively selected transmission channel is tailored specifically to the type of communications traffic sent and received.

In addition to allocating portions of the transmission channel bandwidth for application-specific communications, the network, transport, and application layers may be tailored to suit application-specific communications. As a result, each layer (PHY, link, network, transport, and application) may be tailored to suit application-specific communications.

Table 52 in FIG. 6 illustrates an exemplary scheme for implementing various application-specific communications across multiple layers. Column 54 details categories of application requirements broken down into four categories. Communications having the lowest priority are classified as low criticality and low QoS communications. Alternatively, communications having the highest priority are classified as high criticality and high QoS.

Column 56 refers to adaptations which may be implemented in the physical and link layers to suit various application requirements in column 54. Finally, higher level protocols may be implemented in the network, transportation, and application layers such as the delineated routing protocol adaptation seen in column 58.

Various components (hardware, firmware, and software) may be configured to implement an application-specific communications scheme across multiple layers. In the case of low criticality, low QoS communications, FHSS may be implemented on a single band in the link (MAC) and PHY layers by transmitter module 12 (FIG. 1). An associated network routing protocol may be implemented in software and firmware. In the case of low priority communications, this routing protocol may be a legacy routing algorithm.

In the case of higher criticality yet lower QoS communications, the multilayer adaptation does not consider an implementation as such application-specific communications is not likely.

In the case of lower criticality yet higher QoS communications, the link and physical layer implementation may be an adaptive, multi-channel FHSS scheme as previously described sent over a low congestion-level path. Finally, in the case of the highest priority communications (high criticality and high QoS), the physical/link implementation may include adaptive, multi-channel FHSS as previously described with the inclusion of a voting/pair checking algorithm to select the highest reliability redundant data. Again, such transmissions may be sent over a low congestion-level path by the higher layer routing protocol adaptation.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

While one or more embodiments of the present invention have been illustrated in detail, the skilled artisan will appreciate that modifications and adaptations to those embodiments may be made without departing from the scope of the present invention as set forth in the following claims.

What is claimed is:

1. An adaptive multi-channel architecture for a wireless network, comprising:
    a frequency hopping sequence generator module compliant with a frequency hopping spread spectrum (FHSS) communications protocol, the frequency hopping sequence generator module configured to perform FHSS concurrently on a plurality of communications channels; and
    a frequency replacement module coupled to the frequency hopping sequence generator module, the frequency replacement module configured to receive feedback data over a feedback channel and adaptively select a transmission channel from the plurality of communications channels based on the feedback data.

2. The architecture of claim 1, further including an integration manager module operational on the frequency replacement module configured to integrate scheduled and unscheduled communications traffic into the transmission channel.

3. The architecture of claim 2, wherein the integration manager module includes a system timer configured to divide bandwidth of the transmission channel into a scheduled portion, an unscheduled portion, and a network status portion that further comprises frequency and network status data.

4. The architecture of claim 3, wherein the scheduled portion is compliant with a deterministic scheduling communications protocol.

5. The architecture of claim 3, wherein the unscheduled portion is compliant with an unscheduled or asynchronous media access control communications protocol.

6. The architecture of claim 1, wherein the feedback data includes frequency status data and network status data.

7. The architecture of claim 6, wherein the frequency replacement module is further configured to generate a table of bad frequencies from the frequency status data.

8. The architecture of claim 6, wherein the feedback channel provides information to a routing protocol to calculate an appropriate route.

9. The architecture of claim 8, wherein the frequency hopping spread spectrum (FHSS) communications protocol is one of a single-channel FHSS, adaptive multi-channel FHSS, and adaptive multi-channel FHSS using a voting algorithm.

10. The architecture of claim 1, wherein the frequency replacement module is integrated into a transmitter device.

11. An adaptive multi-channel communications system, comprising:
    means for generating a frequency hopping sequence compliant with a frequency hopping spread spectrum (FHSS) communications protocol and performing FHSS concurrently on a plurality of communications channels; and
    means for frequency selection coupled to the means for generating a frequency hopping sequence, the means for frequency selection receiving feedback data over a feedback channel and adaptively selecting a transmission channel from the plurality of communications channels using the feedback data, wherein the means for frequency selection adaptively selects a plurality of additional transmission channels from the plurality of communications channels for performing multiple concurrently redundant transmissions.

12. The system of claim 11, further including integration means coupled to the frequency selection means, the integration means integrating scheduled and unscheduled communications traffic into the transmission channel.

13. The system of claim 11, wherein the frequency selection means implements a voting algorithm over the plurality of additional transmission channels.

14. The system of claim 11, wherein the feedback data includes frequency status and network status data.

15. The system of claim 14, wherein the feedback data is shared with a plurality of nodes.

16. A method for adaptive multi-channel communication in a wireless network, comprising:
    generating a frequency hopping sequence compliant with a frequency hopping spread spectrum (FHSS) communications protocol concurrently over a plurality of communications channels;
    receiving feedback data over a feedback channel;
    adaptively selecting at least one transmission channel from the plurality of communications channels based on the feedback data;
    selecting a plurality of additional transmission channels from the plurality of communications channels; and
    performing multiple concurrently redundant transmissions over the plurality of additional channels.

17. The method of claim 16, further including integrating scheduled and unscheduled communications traffic into the at least one transmission channel.

18. The method of claim 17, further including dividing a bandwidth of the transmission channel into a scheduled portion, and unscheduled portion and a network status portion.

19. The method of claim 16, further including implementing a routing protocol or a voting algorithm over the at least one transmission channel.

20. An adaptive multi-channel architecture for a wireless network, comprising:
    an integration manager module operational in the multi-channel architecture, the integration manager module configured to integrate scheduled and unscheduled communications traffic into a single transmission channel, the integration manager module comprising a system timer configured to divide bandwidth of the transmission channel into a scheduled portion, an unscheduled portion, and a network status portion, the network status portion containing data that permits the transmitter to selectively implement a network routing algorithm tailored to an application of the communicated data.

21. The architecture of claim 20, further including:
a frequency hopping sequence generator module coupled to the integration manager module, the frequency hopping sequence generator module compliant with a frequency hopping spread spectrum (FHSS) communications protocol and capable of performing FHSS concurrently on a plurality of communications channels; and
a frequency replacement module coupled to the frequency hopping sequence generator module, the frequency replacement module configured to receive feedback data over a feedback channel and adaptively select a transmission channel from the plurality of communications channels based on the feedback data.

22. The architecture of claim 21, wherein the scheduled portion is compliant with a deterministic scheduling communications protocol.

23. The architecture of claim 21, wherein the unscheduled portion is compliant with an unscheduled or asynchronous media access control communications protocol.

\* \* \* \* \*